United States Patent [19]

Harp, Jr.

[11] 4,100,742

[45] Jul. 18, 1978

[54] TURBOCOMPOUND ENGINE WITH TURBOCHARGER CONTROL

[75] Inventor: James L. Harp, Jr., Canoga Park, Calif.

[73] Assignee: The United States of America as represented by the Secretary of the Army, Washington, D.C.

[21] Appl. No.: 748,975

[22] Filed: Dec. 9, 1976

[51] Int. Cl.² .............................................. F02D 23/00
[52] U.S. Cl. .......................................... 60/602; 60/624
[58] Field of Search ................. 60/598, 600, 601, 602, 60/603, 605, 612, 624

[56] References Cited

U.S. PATENT DOCUMENTS

| | | | |
|---|---|---|---|
| 2,625,006 | 1/1953 | Lundquist | 60/624 |
| 3,383,092 | 5/1968 | Catier | 60/605 |
| 3,673,798 | 7/1972 | Kuehl | 60/605 |
| 3,740,170 | 6/1973 | Miller | 417/407 |
| 3,961,484 | 6/1976 | Harp | 60/624 |

*Primary Examiner*—Louis J. Casaregola
*Attorney, Agent, or Firm*—Peter A. Taucher; John E. McRae; Nathan Edelberg

[57] ABSTRACT

An exhaust energy extraction system for a multi-cylinder engine, comprising an axial flow turbine arranged to convert time-spaced exhaust pressure pulses into turbine rotor rotation. Output flow from the axial flow turbine is directed through a diffuser that converts velocity pressure to static pressure; a second radial flow turbine is operated by the steady state flow produced by the diffuser. Any tendency of the diffuser to exert an adverse back pressure on the axial flow turbine is counteracted by a pressure-responsive vent valve that establishes a ceiling on the diffuser pressure.

1 Claim, 3 Drawing Figures

TURBOCOMPOUND ENGINE WITH TURBOCHARGER CONTROL

The invention described herein may be manufactured, used, and licensed by or for the Government for governmental purposes without payment to me of any roalty thereon.

BACKGROUND AND SUMMARY OF THE INVENTION royalty

U.S. Pat. No. 3,383,092 issued to J. M. Cazier on May 14, 1968 shows an energy extraction system for the exhaust flow from a multi-cylinder engine. One of the systems shown in this patent includes an axial flow turbine (FIGS. 7 and 8) for converting exhaust pulses from the individual cylinders into turbine rotation. The cylinders are arranged to direct the exhaust pulses into two separate stacks or manifolds 17 and 18 leading to separate inlets for a single common turbine rotor.

U.S. Pat. No. 3,961,484 issued to me on June 8, 1976 discloses a "stack-value area" sizing system which minimizes throttling losses across the exhaust valves for the cylinders. Each exhaust stack is sized to have less flow area than the associated valve, thereby avoiding the expansion turbulence that otherwise occurs in conventional arrangements wherein the stack has a greater flow area than the associated valve.

The present invention is directed to a system that is generally similar to that shown in U.S. Pat. No. 3,383,092, except that a second radial flow turbine is arranged downstream from the axial flow turbine. The axial flow turbine is equipped with an inlet volute designed to convey the individual pressure pulses to the turbine rotor at substantially pulse initiation velocity, i.e., there is a minimum slowdown or velocity deceleration between the individual cylinders and the turbine rotor. The rotor of the axial flow turbine is preferably designed for dual use as a turbine and a pump; during pulse-flow periods the rotor acts as a turbine, and during the no-pulse periods the rotor acts as a pump to produce a suction effect in the turbine inlet.

Flow output of the axial flow turbine is directed through a diffuser that converts velocity pressure to static pressure with minimum turbulence losses. The resultant essentially steady state flow is applied to the aforementioned radial flow turbine. The individual turbines are preferably connected to different power-absorbing devices. For example, the axial flow turbine may be used to drive a turbocharger for the engine supply air, while the radial flow turbine may be geared to the engine output shaft to contribute added engine output power.

The present invention may be used in an engine system that includes structural relationships embodying my earlier U.S. Pat. No. 3,961,484.

THE DRAWINGS

THE DRAWINGS IN GREATER DETAIL

Figure 1:
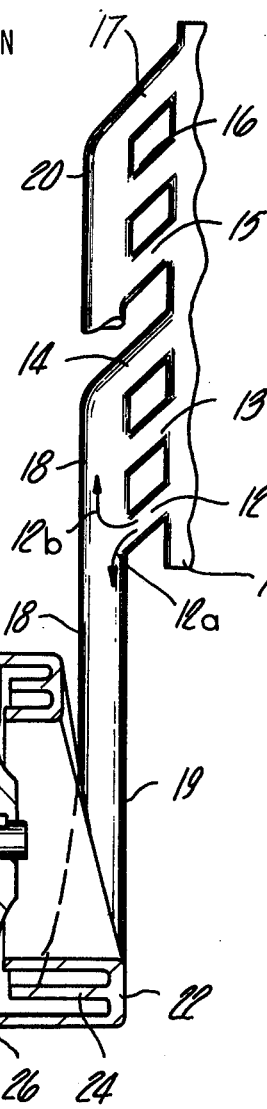
FIG. 1 is a semi-schematic representation of an engine exhaust extraction system incorporating the invention.
Figure 3:
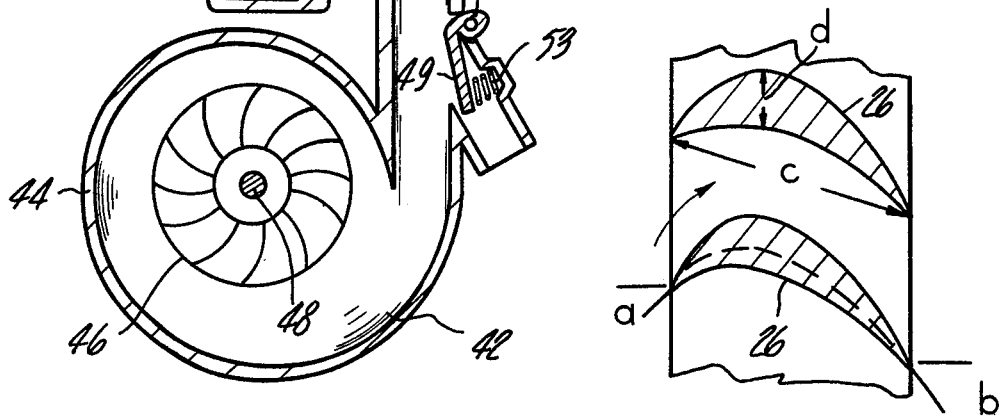
FIG. 3 shows a blade profile used in an axial flow turbine included in the FIG. 1 system.

FIG. 1 illustrates an engine 10 having six exhaust ducts 12 through 17 connected to two separate manifolds or stacks 18 and 20 in the fashion described in U.S. Pat. No. 3,383,092. The connections are preferably such that successive exhaust pressure pulses are directed alternately to the different manifolds 18 and 20, i.e., one pulse is directed into manifold 18 and the next pulse is directed into manifold 20, and so on. One typical cylinder firing order is 1-5-3-6-2-4.

Individual manifolds 18 and 20 are connected to an inlet volute 22 having an internal partition 24 constructed similarly to the corresponding partition shown in U.S. Pat. No. 3,383,992. The individual pressurized streams are admitted to the blades 26 of an axial flow rotor 28 carried on one end of a rotary shaft 30. The other end of shaft 30 carries the rotor or impeller 32 of a compressor (turbo-charger) 34. High velocity gases flowing through the blades 26 of turbine 28, for example at about 2600 feet per second, produce high speed rotation of shaft 30, for example 70,000 revolutions per minute. The shaft in turn drives rotor 32 which pumps or compresses air admitted through inlet 36. The compressed air is supplied to the engine for combustion purposes in the usual fashion.

The flow output from turbine blades 26 is passed into an outwardly radiating diffuser 40 that gradually decelerates the flowing fluid and thereby converts velocity pressure to static pressure with minimum turbulence losses. Diffuser output, essentially devoid of fluctuations or instabilities, is directed into the scroll 42 of a conventional radial flow turbine 44 having a rotor 46 mounted on a shaft 48. Shaft 48 may be geared to the engine output shaft to augment useful engine power.

Exhaust flows from individual engine cylinders are spaced apart timewise. Each exhaust pulse discharges into a relatively stagnant zone in the respective duct 12, 13, 14, etc., thus generating losses as the fast-moving gas mixes into the stagnant gas. Additional losses are generated as the gas moves from the individual duct 12, 13 or 14 into the manifold 18. The manifold provides a potential flow path that is larger than the individual duct 12, 13 or 14.

As shown by arrows 12a and 12b, the gas in duct 12 has two potential paths as it reaches manifold 18. The total cross sectional area of these two potential paths is larger than the area of duct 12. Therefore the gas pulse emerging from duct 12 experiences turbulent losses due to its rapid deceleration at the duct-manifold junction. Similar losses are possible as the other gas pulses emerge from the other ducts 13 and 14 into manifold 18. The gas flowing along manifold 18 from duct 14 experiences additional mixing losses as it passes the branch ducts 13 and 12. The losses are occasioned by the fact that the preceding cylinder-discharge pulse has been substantially extinguished or stagnated when the next pulse is propogated. Similar effects take place in manifold 20.

An aim of the present invention is to provide suction conditions in the downstream area 19 of manifold 18. The suction condition will hopefully pull each pulse toward turbine 28 instead of permitting the pulse to destructively oscillate from one branch duct toward another. It is believed that the desired suction effect can be promoted by making the diameter of manifold 18 approximately the same as the diameter of each supply duct 12, 13 or 14; this tends to minimize expansion turbulence, as when there are abrupt increases in flow cross section. The desired suction effect can also be promoted if turbine rotor 28 can be made to act as a pump during part of the cycle. Hopefully rotor 28 can act as an energy-absorbing turbine during one pulse-utilization time interval, and as an energy-imparting pump during the next pulse-feeding time interval.

Figure 2:
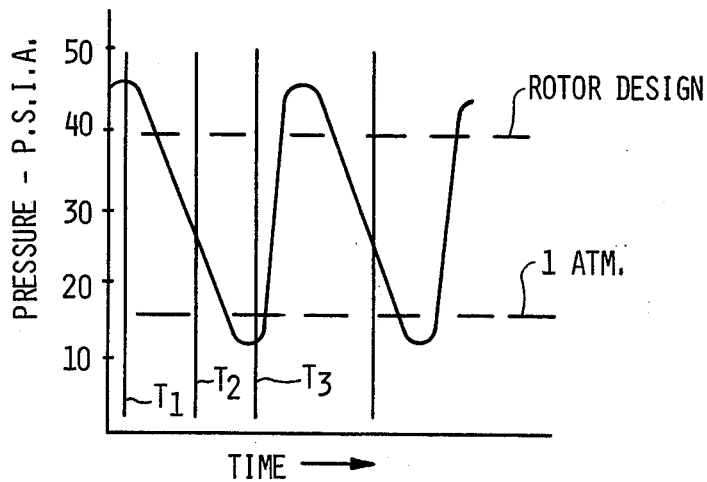
FIG. 2 is a pressure-time curve for the system of FIG. 1.

FIG. 2 is a graph depicting pressure conditions believed attainable in the downstream area 19 of manifold 18 (and the corresponding area of manifold 20). At time $T_1$ the cylinder exhaust valve has been opened for a sufficient interval to produce maximum pulse pressure; subsequently the pressure drops or degrades due to outflow of gas from the engine cylinder. At time $T_2$ the exhaust valve is closed; the pressure in manifold area 19 continues to drop. At time $T_3$ the next exhaust valve opens, thereby permitting a rapid pressure build-up in the downstream area of manifold 20. Advantageously manifold 20 is at sub-atmospheric pressure at time $T_3$; therefore the manifold has a tendency to pull the gas into the turbine rotor, thereby minimizing mixing and turbulence losses in the manifold-duct system.

The ability of the turbine rotor 28 to produce a subatmospheric condition in the manifold is partly a result of rotor design and partly a result of volute 22 pulse transport design. The volute should have internal cross section sufficiently small to pass the individual pulses into the turbine rotor at essentially pulse-initiation velocity; the volute should not permit such gas expansion as would convert velocity pressure to static pressure or destructive turbulence. Rotor 28 should be designed to extract energy from the gas at a gas velocity corresponding to a pressure near the pulse peak; the desired pressure, approximately 40 p.s.i. in FIG. 2, may produce a corresponding peak gas velocity of about 2600 feet per second in volute 22.

One rotor design believed suitable is the following:

Blade Complement — 32 blades
Hub 28 diameter — 2.8 inch
Blade tip diameter — 3.8 inch
Blade entry angle $a$ — 37°
Blade exit angle $b$ — 33°
Blade chord length $c$ — 0.55 inch
Blade thickness $d$ — 0.16 inch
Flow passage width — 0.16 inch This rotor design achieves a blade velocity of about 1000 feet per second and a rotational velocity of about 70,000 revolutions per minute when the entering gas pulse velocity is 2,600 feet per second. High velocity of the relatively small diameter turbine enables the turbine to act as a pump during low-pressure intervals.

The radial in-flow turbine 44 is intended to operate at essentially steady-state conditions. Therefore radial diffuser 40 and scroll 42 are designed to produce a gradual deceleration of the gas exiting from blades 26 of the axial flow turbine. The diffuser structure at 40,42 converts velocity pressure into static pressure with minimum turbulence losses.

It may be practically impossible for diffuser structure 40,42 to achieve a satisfactory division of pressure between the axial flow turbine and the radial flow turbine under all operating conditions. Under certain conditions, e.g. maximum engine loads or at idle speeds, the throttling effect of the radial flow turbine and diffuser structure 40,42 may produce a choking effect on pulse flow through the axial flow turbine. To minimize this problem the diffuser structure is provided with a pressure-responsive vent valve 49 shown pivotally mounted on a shaft 51. A spring 53 biases the valve closed against the pressure within the diffuser passage. When the pressure increases to a potential-choke level it opens the valve and thereby reduces the pressure to a safe value.

Summarizing the overall operation, normal engine cycles produce time-spaced pressure pulses in manifolds 18 and 20; these pulses alternate so that a pressure pulse in manifold 18 is followed by a pressure pulse in manifold 20, and so on. The manifolds 18 and 20 and volute 22 are designed to deliver each pulse to turbine blades 26 at approximately pulse-propagation velocity. The turbine blades, moving at relatively high velocity, absorb pulse energy during the pulse-utilization periods. During the intervening low-pressure periods the turbine blades act as pumping elements to establish suction conditions in manifolds 18 and 20. Such suction conditions promote flow of the next pulse toward the turbine.

The radial flow turbine 44 operates at steady state conditions due to the action of diffuser 40 whereby pulse velocity pressure is converted to static pressure when the gas reaches scroll 42. Vent valve 49 minimizes pressure build-ups that might exert adverse back pressure effects on the axial flow turbine.

It is believed that by using two turbines it should be possible to extract a greater percentage of the total energy in the exhaust gas than when only one turbine is used. An axial flow turbine is best suited to efficiently absorb impulse energy, whereas a radial flow turbine is suited to efficiently operate on steady state pressure energy. The overall arrangement is believed to produce more complete scavenging of the engine cylinders due to suction effects and lesser flow resistance offered by manifolds 18 and 20.

The drawings are largely schematic. Variations in design, component size, and component orientation may be made to adapt the system to different engines, in accordance with the invention recited in the appended claims.

I wish it to be understood that I do not desire to be limited to the exact details of construction shown and described for obvious modifications will occur to a person skilled in the art.

I claim:

1. An exhaust energy extraction system for an engine having two groups of cylinders, said system comprising plural manifolds, each receiving exhaust pressure pulses from one group of cylinders; the manifolds being connected to alternate-firing cylinders, whereby successive pulses are delivered to different manifolds; each manifold having a flow area approximately the same as the exhaust valve area for an individual engine cylinder whereby linear flow velocity of each pulse is maintained during transport thereof through the manifold; a first axial flow turbine having an inlet volute that is internally partitioned to define an inner annular volute section for directing gas onto the inner blade areas of the turbine rotor, and an outer annular volute section for directing gas onto the outer blade areas of the turbine rotor; the inlet volute being operatively located so that its inner annular volute section is connected to one of the manifolds, and its outer annular volute section is connected to the other manifold; a second radial flow turbine receiving the total output from the axial flow turbine; a diffuser of gradually increasing flow area connecting the outlet of the axial flow turbine to the inlet of the radial flow turbine, whereby velocity pressure in the gas is converted to static pressure by the time the gas enters the rotor of the radial flow turbine; a pressure-responsive vent valve controlled by pressures within the diffuser for venting gas from the system when the static pressure in the diffuser begins to exert a choking effect on pulse flow through the axial flow turbine; a centrifugal air compressor mechanically connected to the rotor of the axial flow turbine for air supercharging the engine; said radial flow turbine being mechanically connected to the output shaft of the engine to augment useful engine output.

* * * * *